United States Patent [19]
Csaszar et al.

[11] Patent Number: 5,452,038
[45] Date of Patent: Sep. 19, 1995

[54] DRIVER DEVICE FOR OPENING LIGHT SHIELD OF FILM CASSETTE BIASES LIGHT SHIELD CLOSED

[75] Inventors: Douglas M. Csaszar, Geneseo; Christopher P. McCormick, Rochester, both of N.Y.

[73] Assignee: Eastman Kodak Company, Rochester, N.Y.

[21] Appl. No.: 293,533

[22] Filed: Aug. 19, 1994

[51] Int. Cl.⁶ .................................. G03B 17/26
[52] U.S. Cl. .......................... 354/275; 354/277; 242/348.4
[58] Field of Search ............ 354/275, 277, 281; 242/348.4

[56] References Cited

U.S. PATENT DOCUMENTS

| | | | |
|---|---|---|---|
| 2,317,096 | 4/1943 | Dunn | 352/76 |
| 2,731,894 | 1/1956 | Leitz et al. | 354/275 |
| 4,255,034 | 3/1981 | Harvey et al. | 354/275 X |
| 5,231,438 | 7/1993 | Smart | 354/281 |
| 5,357,303 | 10/1994 | Wirt | 354/275 |
| 5,359,378 | 10/1994 | Zander et al. | 354/275 |

Primary Examiner—Michael L. Gellner
Assistant Examiner—J. K. Han
Attorney, Agent, or Firm—Roger A. Fields

[57] ABSTRACT

When a film cassette having a light shield that can be rotated open to permit film movement out of and into the cassette interior is loaded into a camera, a torsionally-compliant driver device of the camera for rotating the light shield open and closed is twisted, responsive to initial engagement with the light shield, to oppositely bias the light shield closed.

2 Claims, 5 Drawing Sheets

DRIVER DEVICE FOR OPENING LIGHT SHIELD OF FILM CASSETTE BIASES LIGHT SHIELD CLOSED

Reference is made to commonly assigned copending applications Ser. No. 08/181,286, entitled FILM CASSETTE WITH LOCKABLE LIGHT SHIELD and filed Jan. 13, 1994 in the names of Dennis R. Zander and Douglas M. Csaszar, and Ser. No. 08/198,221, entitled FILM CASSETTE WITH LOCKABLE LIGHT SHIELD and filed Feb. 17, 1994 in the names of Michael L. Wirt, each of which are assigned to the assignee of this application.

FIELD OF THE INVENTION

The invention relates generally to the field of photography, and in particular to an auxiliary driver device for opening and closing a light shield of a film cassette.

BACKGROUND OF THE INVENTION

It is known to provide a film cassette with a light shield that can be closed to prevent ambient light from entering the cassette interior and can be opened to permit film movement out of and into the cassette interior.

For example, commonly assigned prior art U.S. Pat. No. 5,231,438, issued Jul. 27, 1993, discloses a film cassette with a light shield that can be rotated closed to prevent ambient light from entering the cassette interior and can be rotated open to allow film movement out of and into the cassette interior, and an auxiliary driver device of a camera which is engageable with the light shield to rotate the light shield open and closed when the film cassette is loaded in the camera.

SUMMARY OF THE INVENTION

According to the invention, a film cassette comprising a light shield that can be rotated closed to prevent ambient light from entering the cassette interior and can be rotated open to allow film movement out of and into the cassette interior, and an auxiliary driver device engageable with the light shield to rotate the light shield open and closed, are characterized in that:
  the driver device is resilient to yield to a twisting force and yet have the capability of recovering its former shape when the twisting force is removed; and
  the light shield has torsional deforming means for applying a twisting force to the driver device to make the driver device oppositely bias the light shield closed when the driver device is engaged with the light shield.

DETAILED DESCRIPTION OF THE INVENTION

The invention is disclosed as being embodied preferably in a certain type of film cassette. Because many of the features of this type of film cassette have become known in the prior art as exemplified by U.S. Pat. No. 5,319,407, issued Jun. 7, 1994, and U.S. Pat. No. 5,296,887, issued Mar. 22, 1994, the description which follows is directed in particular only to those elements forming part of or cooperating directly with the disclosed embodiment. It is to be understood, however, that other elements may take various forms known to a person of ordinary skill in the art.

Figure 1:
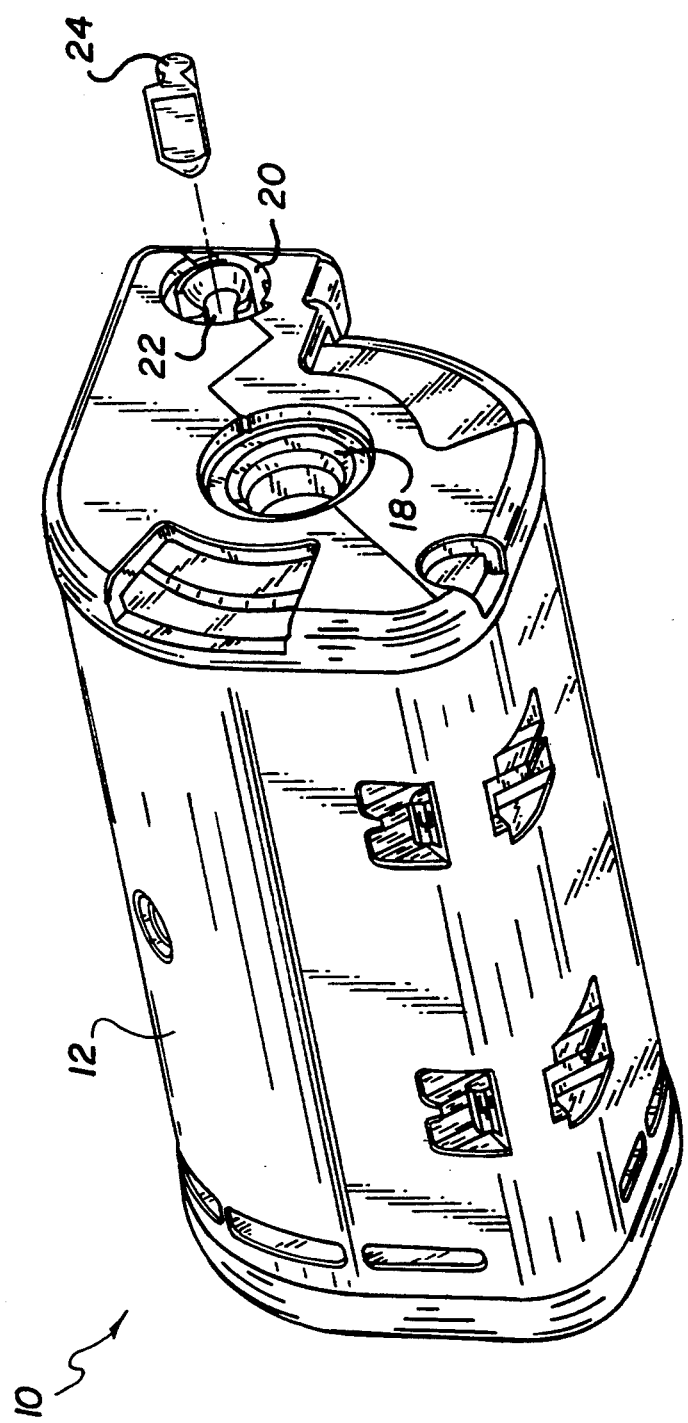
FIG. 1 is a rear perspective view of a film cassette and an auxiliary driver device for opening and closing a light shield of the film cassette.
Figure 2:
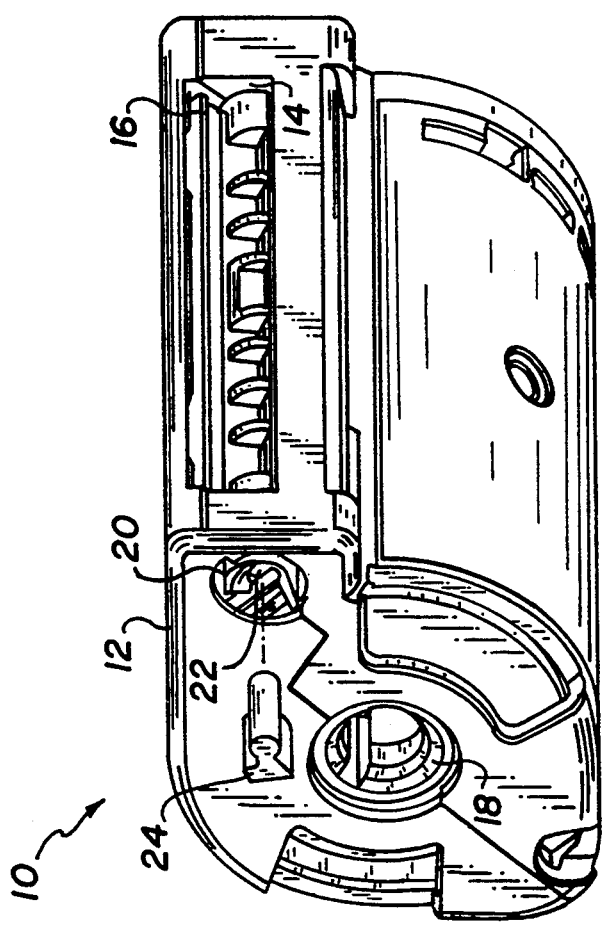
FIG. 2 is a front perspective view of the film cassette and the driver device, illustrated with the light shield open.
Figure 5:
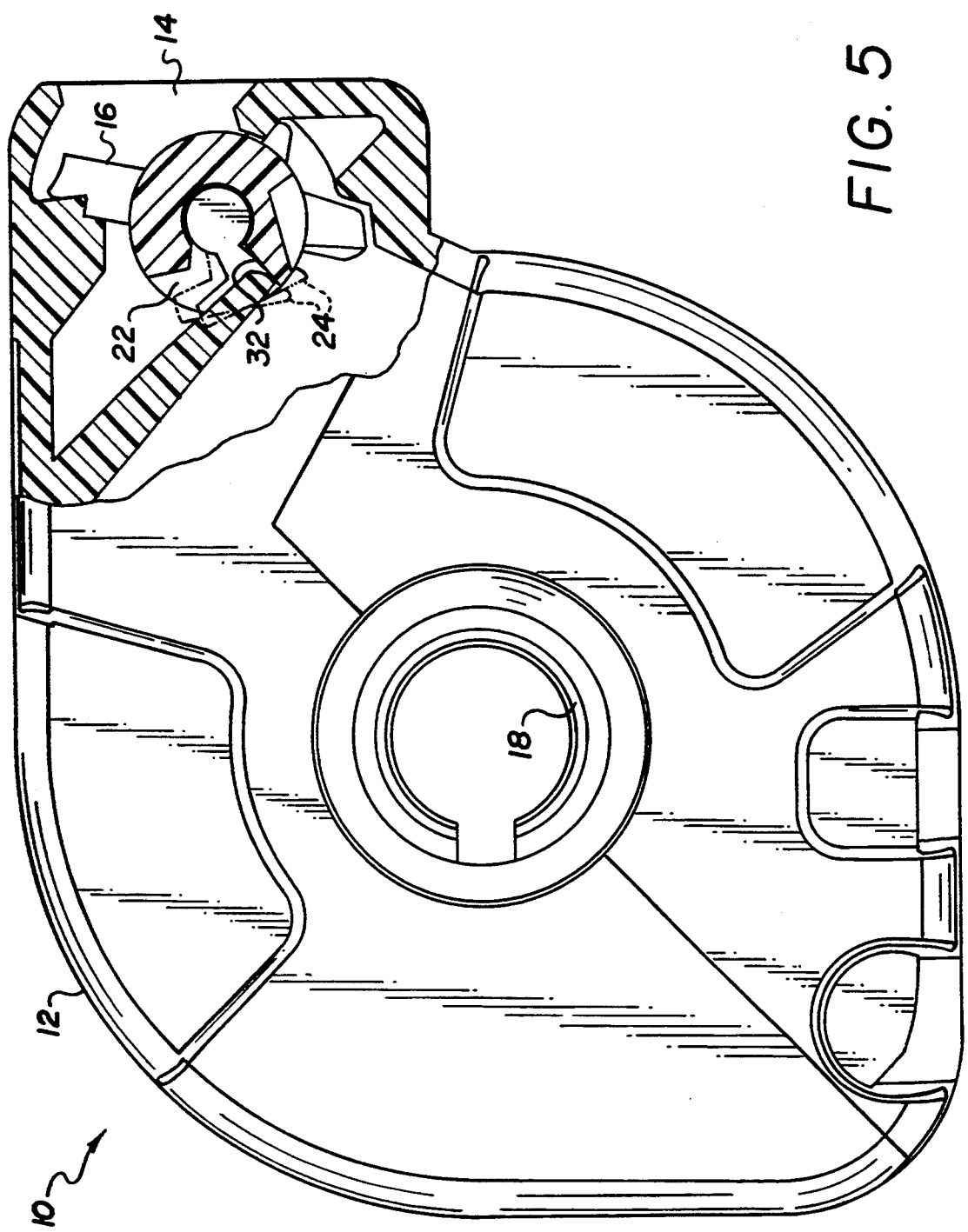
FIG. 5 is a sectional view of the driver device engaged with the light shield.

Referring now to the drawings, FIGS. 1, 2 and 5 show a film cassette 10 comprising a cassette shell or housing 12 with a film egress/ingress slot 14, a light shield 16, and a film supply spool 18.

The light shield 16 has a pair of opposite end posts 20 (only one shown) which are supported via the cassette shell 12 to enable the light shield to be rotated closed as depicted in FIG. 5, to prevent ambient light from entering the shell interior through the film ingress/egress slot 14, and to be rotated open as depicted in FIG. 2, to allow film movement out of and into the shell interior through the film egress/ingress slot (in a camera, for example, as suggested in prior art U.S. Pat. No. 5,231,438).

Figure 3:
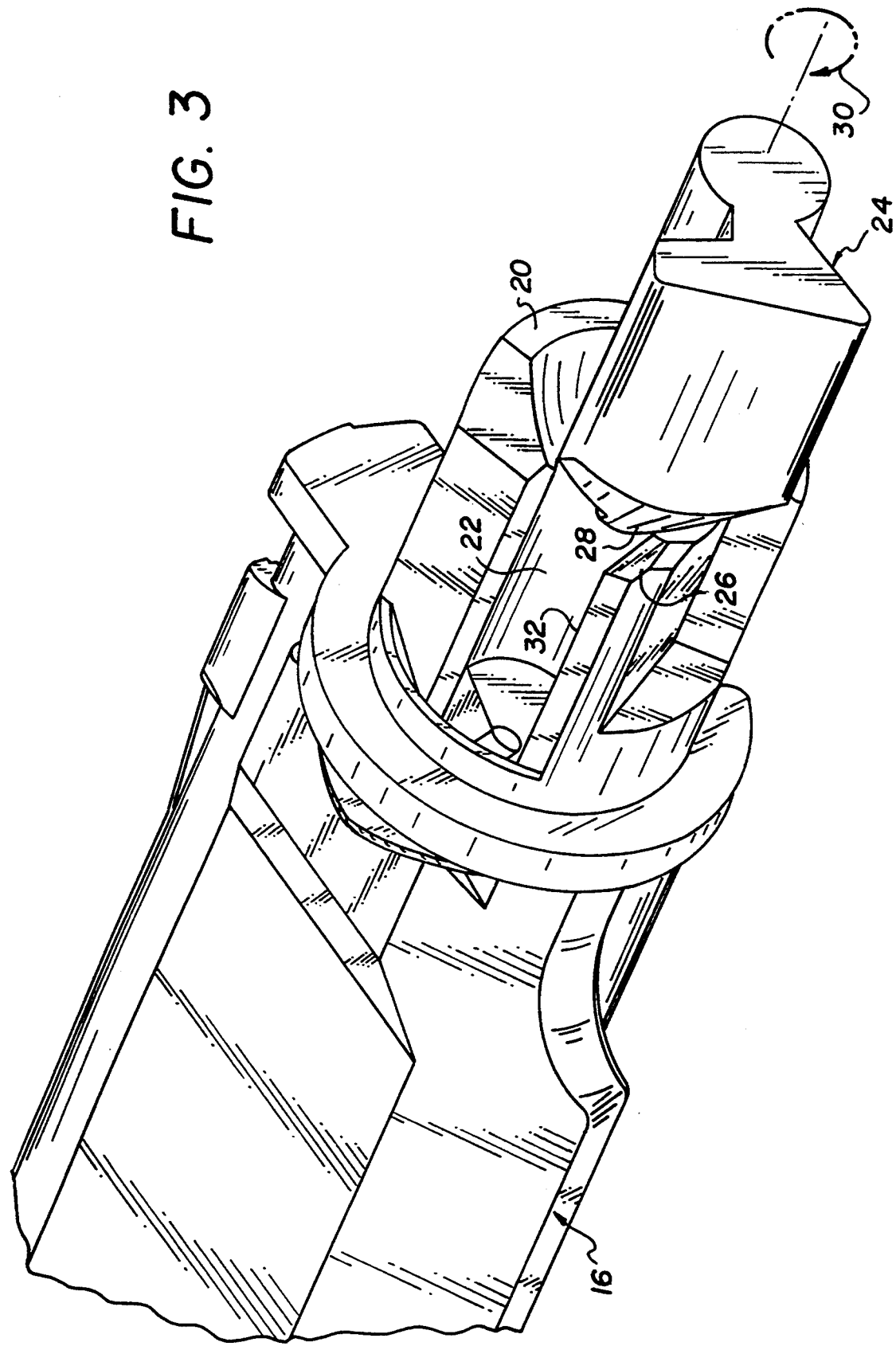
FIGS. 3 and 4 are perspective views of the light shield and the driver device, sequentially depicting how the driver device is engaged with the light shield.
Figure 4:
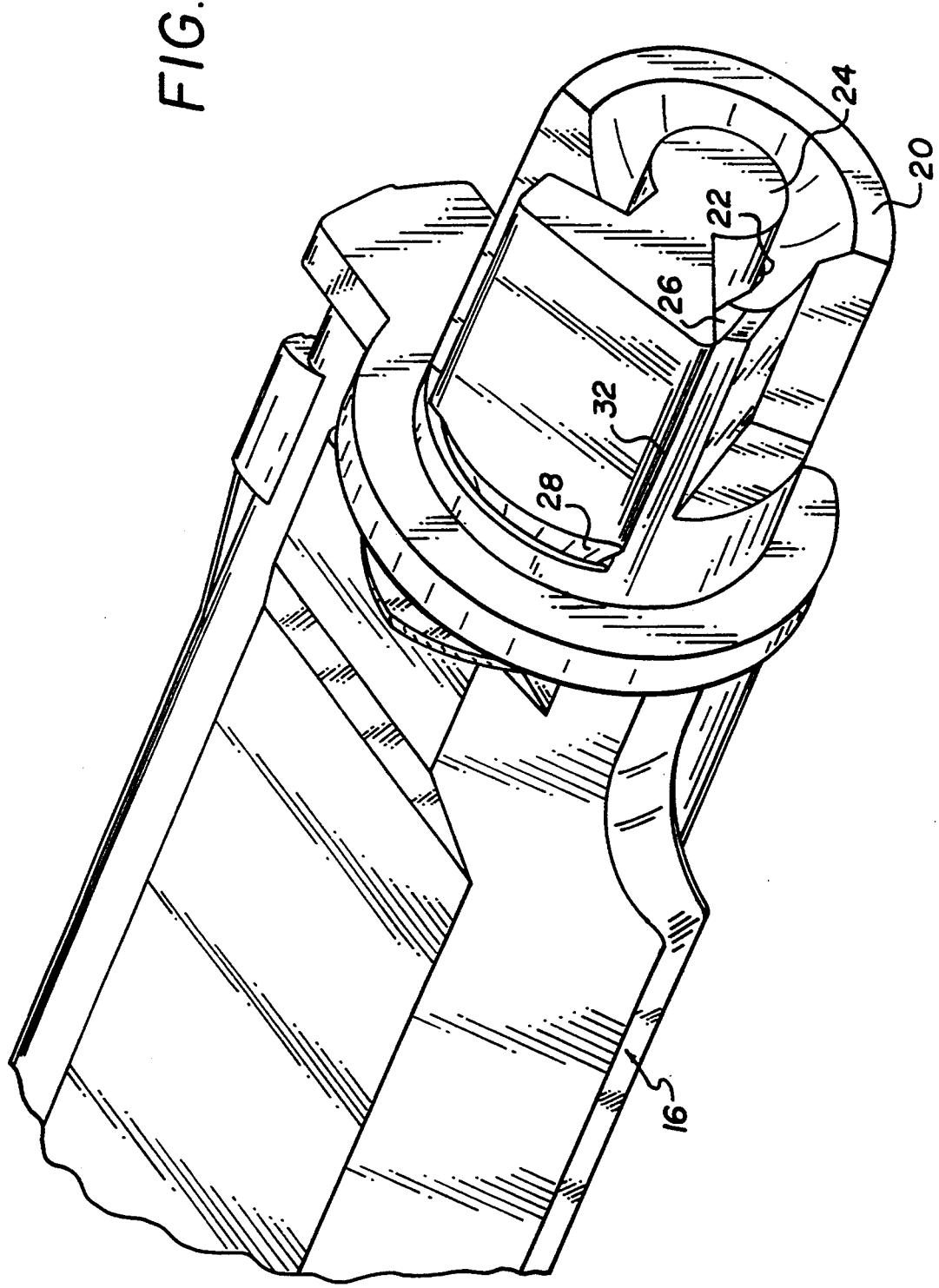

As shown most clearly in FIGS. 3 and 4, the end post 20 of the light shield 16 has a coaxial cavity 22 for receiving a rotary driver device 24 (in a camera, for example, as suggested in prior art U.S. Pat. No. 5,231,438) to rotate the light shield open and closed (when the film cassette 1 is loaded in the camera). A locking pawl (not shown, but disclosed in the cross-referenced applications) protrudes into the coaxial cavity 22 to secure the light shield 16 closed, but is adapted to be displaced from the coaxial cavity to release the light shield when the driver device 24 is received in the coaxial cavity.

According to the invention, the driver device 24 is slightly resilient or elastic to yield to a substantial twisting force and yet have the capability of recovering its former shape and size when the twisting force is removed. The light shield 16 has torsional deforming means, depicted as a beveled cam-like edge 26 inwardly adjacent the entrance to the coaxial cavity 22, which bears against a leading cone-like surface 28 of the driver device 24 when the driver device is first received in the coaxial cavity, to apply a twisting force 30 to the driver device. See FIG. 3. The twisting force 30 is in the same direction as opening movement of the light shield 16, i.e. it is opposite to closing movement of the light shield. FIG. 5 illustrates the driver device 24 in solid line in its original shape before being received in the coaxial cavity 30, and in broken line as torsionally deformed or twisted by the twisting force 30. When the driver device 24 is fully received in the coaxial cavity 22 as shown in FIG. 4 and in broken line in FIG. 5, since it is torsionally deformed by the twisting force 30 it will oppositely bias the light shield 16 closed by applying a rotational force (which is the reverse of the twisting force) to a flat surface 32 inside the coaxial cavity 22. Thus, the light shield 16 will be maintained closed unless the driver device 24 is rotated to open the light shield.

The invention has been described with reference to a preferred embodiment. However, it will be appreciated that variations and modifications can be effected by a

PARTS LIST 10. film cassette
12. cassette shell
14. film egress/ingress slot
16. light shield
18. film supply spool
20. end post
22. coaxial cavity
24. driver device
26. beveled cam-like edge
28. leading cone-like surface
30. twisting force
32. flat surface

We claim:

1. A film cassette comprising a light shield that can be rotated closed to prevent ambient light from entering the cassette interior and can be rotated open to allow film movement out of and into the cassette interior, and an auxiliary driver device engageable with said light shield to rotate the light shield open and closed, are characterized in that:

said driver device is resilient to yield to a twisting force and yet have the capability of recovering its former shape when the twisting force is removed; and said light shield has torsional deforming means for applying a twisting force to said driver device to make the driver device oppositely bias the light shield closed when the driver device is engaged with the light shield.

2. A film cassette comprising a light shield engageable with an auxiliary driver device to permit the driver device to rotate the light shield closed to prevent ambient light from entering the cassette interior and to rotate the light shield open to allow film movement out of and into the cassette interior, is characterized in that:

said light shield has torsional deforming means for applying a twisting force to the driver device to make the driver device oppositely bias the light shield closed when the driver device is engaged with the light shield.

* * * * *